July 27, 1965     L. R. BLAKE     3,197,381
NUCLEAR REACTOR FUEL ELEMENTS

Filed Oct. 2, 1961     2 Sheets-Sheet 1

INVENTOR:
LESLIE REGINALD BLAKE
BY
ATTORNEYS

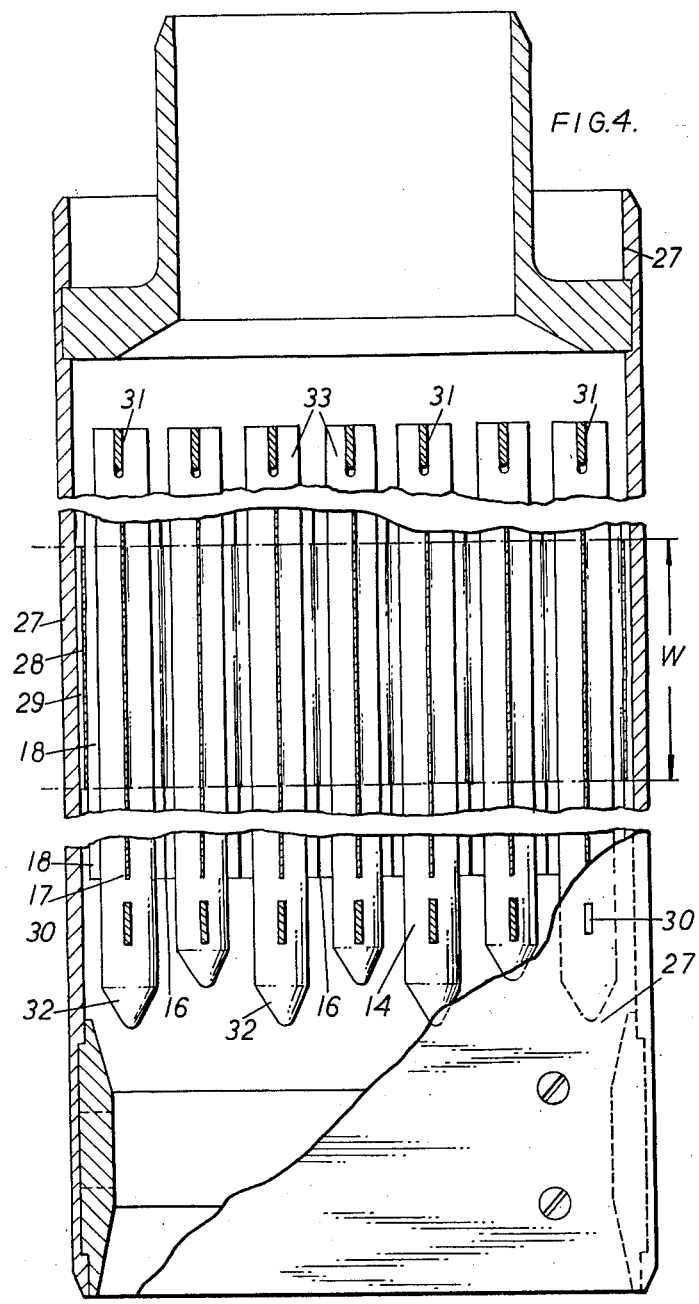

3,197,381
NUCLEAR REACTOR FUEL ELEMENTS
Leslie Reginald Blake, Shepshed, England, assignor to United Kingdom Atomic Energy Authority, London, England
Filed Oct. 2, 1961, Ser. No. 142,039
Claims priority, application Great Britain, Oct. 4, 1960, 33,973/60
3 Claims. (Cl. 176—72)

This application is a continuation-in-part of co-pending application 50,213, filed August 17, 1960.

The present invention relates to fuel elements for nuclear reactors, especially elements suitable for fast reactors in which fission of the fuel is caused predominantly by fast neutrons. It is customary for fuel elements to include a sheath protecting the fuel, and in the case of fast reactors the design and the choice of materials for the sheath is easier than in the case of thermal reactors utilising slower neutrons because in a flux of fast neutrons the neutron capture cross sections of materials are relatively low.

Co-pending patent application No. 50,213 describes and claims sheathed fuel elements embodying the combination of three features, namely, strong sheath, weakened fuel, and expansion space of 10 to 30% within the sheath. This expansion space accommodates irradiation growth of the fuel and also liberated gaseous fission products, so that straining of the sheath as burn-up of the fuel proceeds is reduced and a higher degree of burn-up is possible within the limits of permissible strain in the sheath.

Although failure of a fuel element sheath by over-straining is unlikely, it is nevertheless desirable to ensure that a failure does not create difficulties due to egress of fuel from a breached sheath leading to the flow of coolant over the fuel element being obstructed so that, in the absence of adequate cooling, the fuel element melts and possibly causes an undesirable redistribution of the fuel. This could be avoided by operating the reactor sufficiently below the theoretical rating that the fuel of an uncooled element would not melt, however, under-rating the reactor in this manner is not economically attractive.

The present invention provides a sheathed fuel element, particularly for a fast reactor, which element is filled with fuel to between 50 and 90% of the available fuel volume and has an outer sheath contributing jointly with an inner sheath to withstand an internal pressure of at least 10,000 p.s.i. at a temperature of 600° C., the outer sheath being in direct or indirect heat transfer relationship with the inner sheath. An interposed material of good thermal conductivity is used to establish a thermal bond between the sheaths where there is clearance between them. The double sheathing now proposed is based on a realisation that the attendant difficulty of obtaining adequate heat transfer between the sheaths may be overcome in practice more successfully than the alternative of constructing single thickness sheathing entirely free from defects.

A fuel element in accordance with the invention is composed of a string of individually sheathed fuel sections arranged end to end in a common outer sheath with thermally bonding material between the sheaths; in each of the fuel sections the fuel occupies only between 50 and 90% of the fuel volume provided by its inner sheath so as to leave the requisite voidage. This arrangement has the advantage that the quantity of fuel which is releasable in the event of an inner sheath failure is limited to the contents of one fuel section and increased sub-division into separate sections reduces this quantity.

A fuel assembly which can be charged into a reactor core as a single unit is made up with several fuel elements and the outersheaths of the elements are preferably formed at selected locations with projections, the projections of adjacent elements being engaged at their extremities. Such engagement establishes zones of lateral rigidity for restraining the elements against bowing.

The invention will be further described with reference to the accompanying drawings showing embodiments taken by way of example only.

In the drawings:

FIGURE 4 is a longitudinal view, mainly sectioned, of the assembly of FIGURE 3.

Figures 1, 2:
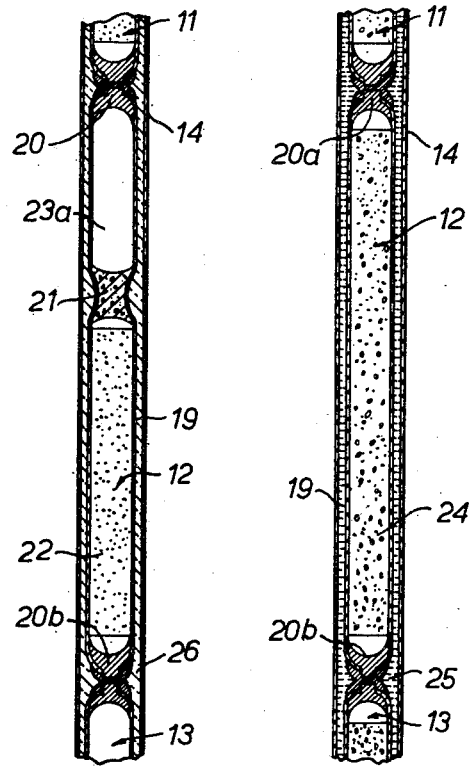
FIGURE 1 is a view in section of the fuel element having ceramic fuel.
FIGURE 2 is a similar view of an element having cermet fuel.

The basic arrangement of the elements of FIGURES 1 and 2 is the same in that a string of cylindrical sheathed fuel sections 11, 12, 13 are encased end to end in a common outer sheath 14 which in cross section (see FIGURE 3) is of an oversize generally circular form flattened in each quadrant to give (although not appearing in FIG. 3 for the sake of clarity) direct contact at the flats with the sheathed fuel sections. This shape of the outer sheath is chosen so that the sheath is yieldable by change of shape to accommodate swelling of the fuel sections. Radially projecting longitudinal ribs 15, 16, 17 and 18 are formed integrally with the outer sheath and extend continuously centrally of the flats from one end to the other of the outer sheath. A suitable metal for the outer sheath is stainless steel, the iron, chromium and nickel alloys known in the trade as "Inconel," or nickel-chrome alloys known under the trade name "Nimonic."

In the case of fuel sections in the element of FIGURE 1, the sheath 19 is swaged over rounded ends of end plugs 20a and 20b, and intermediate the ends the sheath is formed with a neck where it is swaged over a plug 21 of porous stainless steel which separates a fuel space 22 from a gas collection space 23. The latter space represents about 30% of the total volume of these two spaces. The ceramic fuel, which fills the fuel space almost completely, is a mixture of uranium and plutonium oxides packed at 80 to 95% of the theoretical density. Although a high operating temperature is to be expected in such fuel, the temperature of the sheaths is less which together with the relative inertness of the oxide fuel permits the metals previously specified in connection with the outer sheath to be used for the inner sheath as well. This design of fuel section encourages continuous release of gaseous fission products during irradiation of the fuel in that these products can escape through the porous plug 21 to the gas collection space 23. The high operating temperature is believed to promote more gas release in oxide fuel than at the temperatures usual in thermal reactors and therefore the allowance of space for gas collection is based on release of the gas to the full extent.

In the case of the fuel sections in the element of FIGURE 2, the internal voidage is not separated from the fuel mass but is distributed throughout the mass. The available space between the end plugs 20a, 20b is therefore filled almost completely with the cermet fuel 24 which is a mixture of uranium and plutonium oxides dispersed in a uranium metal diluent. This metal diluent has internal porosity to give an overall voidage of about 25% of the available fuel volume. By confining the porosity to below the surface the possibility can be avoided that liquid metal reactor coolant, such as sodium, on gaining access to the fuel through defective sheathing is caused by boiling at the high fuel temperature to set up additional internal pressures. It is to be expected that the dispersed ceramic material will retain gaseous fission products to a certain extent, and to promote this retention, the ceramic nodules should be between about 0.02 and 0.002 inch in diameter.

Both the illustrated elements have a filling of a material of good thermal conductivity introduced between the outer sheath 14 and the inner sheaths 19 of the fuel sections. This filling serves as a thermal bond between the outer and inner sheaths where clearance exists between them. It has already been mentioned that the element of FIGURE 2 is proof against a possible hazard arising from the use of the sodium and therefore sodium indicated at 25 is used as the thermal bond material in this case. In the case of the element of FIGURE 1 the thermal bond material 26 is chosen to remain solid at the operating temperature and to have weak mechanical properties; examples are copper or brazing metals, including palladium brazes.

Although not visible in detail in the drawings, it is to be understood that the outer sheath is capped at its ends in such manner that jointly with the inner sheathing the requisite ability to withstand internal pressures of at least 10,000 p.s.i. at a temperature of 600° C. is provided. Preferably, however, the dimensions are arranged to cause straining of the outer sheath to a lesser extent than the inner sheaths. Where the thermal bond between the inner and outer sheaths is established by the same material as the reactor coolant, as would be the case in FIGURE 2 when used in conjunction with sodium coolant, the end caps of the outer sheath may be porous to allow intermixing of the bond material with the coolant.

Figure 3:
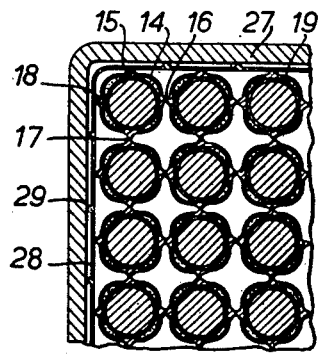
FIGURE 3 is a diagrammatic plan view of part of a fuel assembly made up with elements according to FIGURE 1 or 2.

In the fuel assembly of FIGURES 3 and 4 a square pitched lattice of elements are supported in a rectangular open-ended tubular casing 27 by rows of parallel transverse bars 30 and 31 fixed in the casing adjacent each of its ends, the bars 30 adjacent the lower end passing through slots in lower end caps 32 of the elements and the bars adjacent the upper end engaging in open-ended slots in upper end caps 33 of the elements. In conjunction with the bars, the slots are so directed that the elements are orientated to bring about inter-engagement of the ribs 15 to 18 whereby the space between the elements is divided into separate channels. The inter-engaging ribs are welded together over an approximately centrally situated length indicated W of the elements and co-extensive with this length is a sheet metal liner 28 which is interposed between the casing and the peripheral elements of the lattice. On its outwardly facing side this liner has integral ribs 29 corresponding to those on the elements, such ribs being spaced apart to project into engagement with the casing at points roughly midway between each pair of ribs on adjacent elements. A zone of lateral rigidity of the elements is therefore established over this central length to impose on the elements a restraint against bowing which is slightly yieldable on account of the fuel element ribs 15 to 18 bearing on the liner in the spaces between the liner ribs 29. It will be appreciated that this restraint against bowing is obtained with an open-work construction presenting as little obstruction as possible to the flow of sodium coolant over the elements on passing through the assembly.

For both forms of fuel element described with reference to FIGURES 1 and 2, the fuel content has negligible strength in comparison with the sheathing and, for the purposes of estimating appropriate dimensions for the sheathing, may be disregarded entirely. The sheathing can then be treated as a pressure vessel which is required to withstand the pressure of fission product gas accumulating in the voidage and (on the assumption that the fuel material is virtually incompressible) any swelling of the fuel material due to solid fission fragments.

Considering thin walled cylindrical sheathing of thickness $t$ and internal diameter $d$, it suffices for all practical purposes to regard the hoop stress in the sheathing as being the same as the creep stress $\delta_c^1$ and hence the internal pressure $p$ is given by the equation:

$$p = 2(t/d)\delta_c^1$$

A conservative estimate of the allowable creep stress of a nickel and chromium alloy such as that known in the trade as Nimonic 80 is 50,000 p.s.i. at 600° C. and at the same temperature there is required in accordance with the invention the ability to withstand an internal bursting pressure of at least 10,000 p.s.i. Consequently with these figures taken by way of example the ratio $t/d$ reduces to 0.1. For a fuel element of outer diameter 0.20 inch, this gives a minimum thickness of 0.017 inch for the inner and outer sheaths combined.

For a fast reactor fuel element an outer diameter of the sheath in the range 0.1 to 0.4 inch is typical and the strength requirement in the sheathing is met in general terms by a combined wall thickness to outer diameter ratio of at least 0.1, that is a corresponding wall thickness range of 0.01 to 0.04 inch. The void space amounting to between 10 and 50% of the internal volume of the sheathing provides expansion space for accommodating irradiation growth of the fuel and released gaseous fission products.

Although in the illustrated asembly of fuel element a square lattice arrangement is employed it is to be understood that alternative arrangements such as a triangular lattice in a casing of hexagonal shape are equally within the scope of the invention.

I claim:

1. A nuclear reactor fuel element, particularly for a fast reactor, comprising an outer metal sheath with a generally circular cross sectional shape having flats, at least one individually sealed inner metal sheath disposed within said outer sheath in direct contact with said flats, a thermally bonding material interposed between said outer sheath and said inner sheath where clearance exists between them, and nuclear fuel enclosed within said inner sheath and having a cross sectional shape to provide intimate contact of said fuel with said inner sheath over a major portion of the periphery of said shape, there being left unoccupied by said fuel between 10 and 50% of the interior of said inner sheath.

2. A nuclear reactor fuel element as set forth in claim 1 wherein the outer metal sheath has four flats, one in each quadrant.

3. A nuclear reactor fuel element assembly comprising an open-ended tubular casing, a plurality of elongated generally cylindrical fuel elements each having an outer metal sheath with a generally circular cross sectional shape with flats, a plurality of inner metal sheaths disposed end to end in direct contact with said flats, a thermally bonding material interposed between said inner and outer sheaths where clearance exists between them, and nuclear fuel only partially filling the inner sheaths so as to leave unoccupied by said fuel between 10 and 50% of the interior of each inner sheath, radially directed projections extending longitudinally and continuously over the length of the outer sheath of each of said fuel elements, means supporting said fuel elements in clustered parallel relationship within said casing with the extremities of the projections of adjacent elements engaged, and a yieldable liner interposed between said clustered fuel elements and the wall of said casing, the peripheral elements of said cluster being engaged with the liner at the extremities of those of said projections directed outwardly towards said casing wall.

References Cited by the Examiner

UNITED STATES PATENTS

| | | | |
|---|---|---|---|
| 2,838,452 | 6/58 | West et al. | 176—69 |
| 2,872,401 | 2/59 | Wigner et al. | 176—82 |
| 2,873,853 | 2/59 | Burton | 176—80 |
| 2,879,216 | 3/59 | Hurwitz et al. | 176—43 |
| 2,890,158 | 6/59 | Ohlinger et al. | 176—32 |
| 2,902,422 | 9/59 | Hutter | 176—78 |
| 2,929,768 | 3/60 | Mahlmeister et al. | 176—41 |
| 2,982,713 | 5/61 | Sankovich et al. | 176—61 |

FOREIGN PATENTS 1,197,912 12/59 France.

CARL D. QUARFORTH, *Primary Examiner.*

ROGER L. CAMPBELL, *Examiner.*